US011923636B2

(12) United States Patent
Meyer

(10) Patent No.: US 11,923,636 B2
(45) Date of Patent: Mar. 5, 2024

(54) CABLE CONNECTOR, CABLE CONNECTOR ARRANGEMENT AND D-SUB TYPE CABLE CONNECTOR

(71) Applicant: Turck Inc., Plymouth, MN (US)

(72) Inventor: Mathew Richard Meyer, Hanover, MN (US)

(73) Assignee: TURCK INC., Plymouth, MN (US)

( * ) Notice: Subject to any disclaimer, the term of this patent is extended or adjusted under 35 U.S.C. 154(b) by 0 days.

(21) Appl. No.: 17/471,236

(22) Filed: Sep. 10, 2021

(65) Prior Publication Data

US 2023/0081089 A1 Mar. 16, 2023

(51) Int. Cl.
*H01R 13/58* (2006.01)

(52) U.S. Cl.
CPC ................................ *H01R 13/5825* (2013.01)

(58) Field of Classification Search
CPC .................................................. H01R 13/5825
See application file for complete search history.

(56) References Cited

U.S. PATENT DOCUMENTS 2,480,895 A * 9/1949 Anderson ............ H01R 13/595 24/135 N
4,575,174 A * 3/1986 Leeds .................. H01R 13/585 439/465
4,749,369 A * 6/1988 Wang ................... H01R 13/516 439/459
4,781,330 A * 11/1988 Atkins ............... H01R 13/5812 439/361
6,641,429 B1 11/2003 Wu
6,824,420 B2 * 11/2004 Ushiro ............... H01R 13/5816 439/468
10,892,584 B2 * 1/2021 Boemmel ............ H01R 13/516

OTHER PUBLICATIONS https://en.wikipedia.org/wiki/D-subminiature; retrieved Jul. 19, 22.*

* cited by examiner

*Primary Examiner* — Ross N Gushi
(74) *Attorney, Agent, or Firm* — LEYDIG, VOIT & MAYER, LTD.

(57) ABSTRACT

A cable connector is provided having a backshell defining an interior chamber, wherein the backshell has a cable-guide-through-opening, through which a cable can be guided into the interior chamber; and the cable connector has a strain-relief member for providing a strain-relief to the cable. In order to make an inexpensive and easy to assemble cable connector, that allows multiple sizes of cables or a bundle of cables to enter the backshell by providing sufficient clamping force such that the cable or cables is/are not easily removed, the backshell has at least a first recess extending to the interior chamber; the strain-relief member is adapted to be fixed to an exterior of the cable, and the strain-relief member protrudes from the interior chamber into the first recess for providing the strain-relief to the cable.

21 Claims, 9 Drawing Sheets

CABLE CONNECTOR, CABLE CONNECTOR ARRANGEMENT AND D-SUB TYPE CABLE CONNECTOR

FIELD

The present disclosure relates to a cable connector and to a cable connector arrangement comprising a cable connector and a cable which is guided in an interior chamber of the cable connector.

BACKGROUND

A known D-Sub type connector usually contains two or more parallel rows of pins or sockets surrounded by a substantially D-shaped metal shield that provides mechanical support, ensures correct orientation and may screen against electromagnetic interference.

D-Sub connectors with pin contact are called male connectors or plugs, while those with socket contacts are called female connectors or sockets.

One example of a known cable connector is described in U.S. Pat. No. 6,641,429B1. The cable connector disclosed therein has a respective backshell formed of two parts, an electrical cable received in the backshell and extending therefrom and a strain-relief member for compressing the cable in the backshell. The backshell has a bight portion overridden the electrical cable and a pair of legs depending downward from the bight portion for insertion into receiving holes of the backshell. Via burrs provided on the lateral side of the respective leg, the strain-relief member is interferingly engaged with the backshell.

However, the respective arrangement is complex to mount. It is also not possible to adapt the strain-relief to different configurations of cables or a bundle of cables, such as a cable harness to be introduced in the backshell. Further, when the backshell is closed, it is complicated to release the respective strain-relief member.

SUMMARY

In an embodiment, the present disclosure provides a cable connector having a backshell defining an interior chamber. The backshell has a cable-guide-through-opening, through which a cable can be guided into the interior chamber of the backshell, and the cable connector has a strain-relief member. The backshell has at least a first recess extending to the interior chamber. The strain-relief member is adapted to be fixed to an exterior of the cable, and the strain-relief member protrudes from the interior chamber into the first recess.

In view of the foregoing, it is an object of the present invention to make an inexpensive and easy to assemble cable connector that allows multiple sizes of cables or a bundle of cables to enter the backshell by providing sufficient clamping force such that the cable or cables is/are not easily removed.

BRIEF DESCRIPTION OF THE DRAWINGS

The embodiments of the present disclosure will be described in even greater detail below based on the exemplary figures. The embodiments are not limited to the exemplary embodiments described below. Other features and advantages of various embodiments of the present disclosure will become apparent by reading the following detailed description with reference to the attached drawings, which illustrate the following.

DETAILED DESCRIPTION

Figure 1:
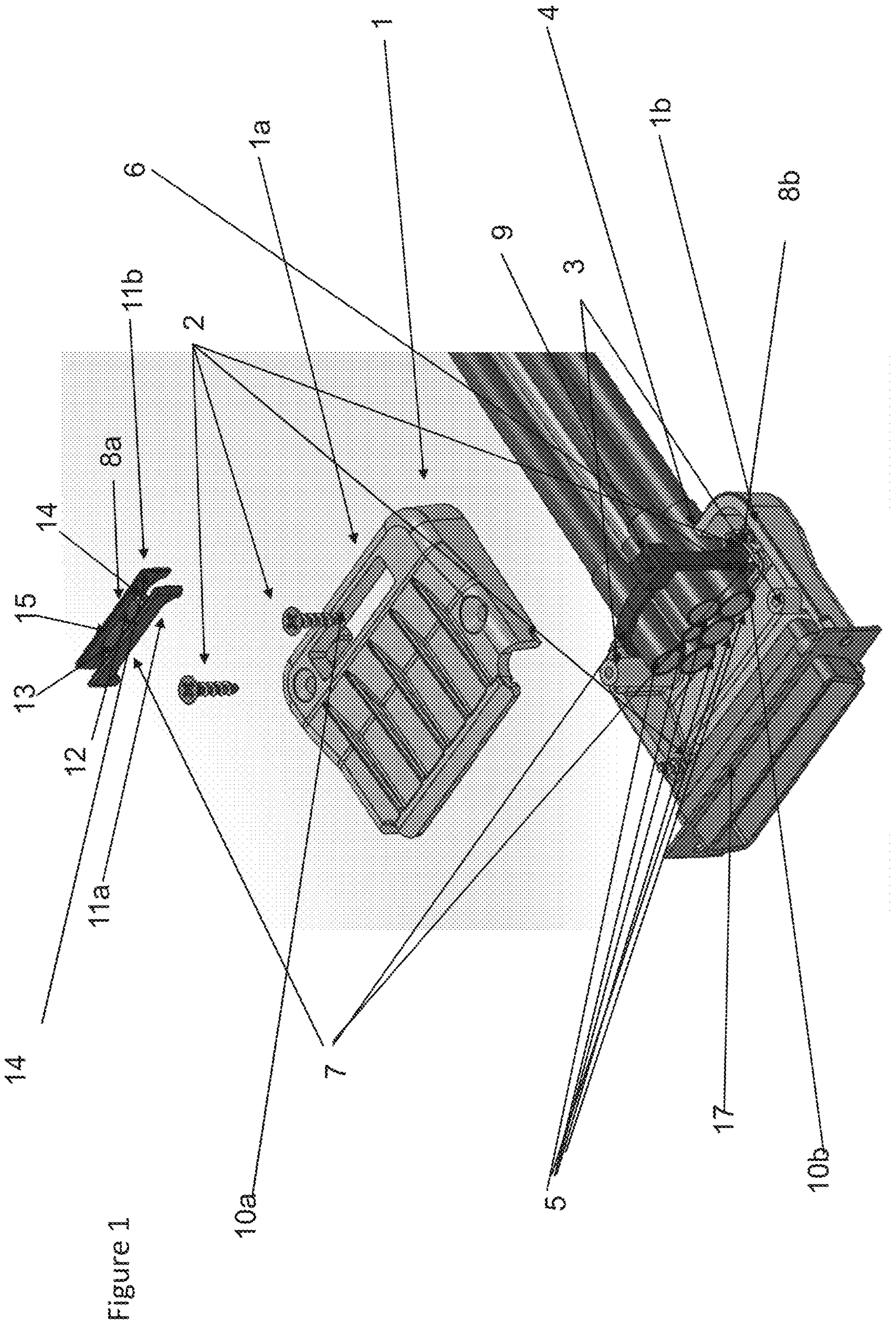
FIG. 1 shows an exploded schematic view of an embodiment of an inventive cable connector.

In particular, the present disclosure provides a further development of a D-Sub type connector. However, the embodiments are not limited to such a D-Sub type connector and can be applied to any connector or any arrangement where a strain-relief of cables is beneficial, e.g., as within the area of backshells.

In order to solve the aforementioned problem, it is provided, according to a first aspect, a cable connector having a backshell defining an interior chamber. The backshell has a cable guide-through-opening, through which a cable can be guided into the interior chamber. Further, the cable connector has a strain-relief member for providing strain-relief to the cable. The strain-relief member firmly holds the cable/cables and provides strain-relief to the cable via the backshell.

The inventive cable connector may have, according to a first aspect, at least a first recess extending to the interior chamber. The strain-relief member is adapted to be fixed to an exterior of the cable. The strain-relief member protrudes from the interior chamber into the first recess for providing the strain-relief to the cable.

Insofar as it is described herein a recess, such a recess may have the form of a through-opening which extends from an outside of the backshell to the interior chamber or such a recess may be provided at in interior wall of the backshell and does not go through the wall such that it is not visible from an exterior of the backshell.

The strain-relief member may have a fixing surface, which is adapted to be fixed to an exterior of the cable, for example to a cover layer of an electrically conductive wire. The strain-relief member protrudes from the interior chamber of the backshell into the first recess in order to provide strain-relief to the cable.

The interaction of the strain-relief member with the recess has the technical effect that, depending on the dimensions of the recess with respect to the strain-relief member, it is possible to direct the strain-relief into a desired direction, while allowing a movement (e.g., a translation) of the cable held by the strain-relief member, together with the strain-relief member in a further desired direction. As there may be a predetermined clearance between the strain-relief member and the recess, the connector is highly adaptable.

There may be provided a form-fit interaction of the strain-relief member, which protrudes from the interior chamber, and the form-fit interaction may optionally have a predetermined clearance for allowing a certain adaptability.

As long as the first recess defines a first through-opening, said first through-opening can be assessed from an exterior, the strain-relief member is visible from an outside and indicates a secure fixation of the cable. Further the respective strain-relief member may also be demounted or loosened while the respective backshell is not opened.

Although recesses and in particular through-openings are described herein, there can be provided a form-fit interaction which optionally allows a certain relative movement between the backshell and the strain-relief member. There may be provided at least two opposing ribs or walls protruding from an interior wall of the backshell, which interact with the strain-relief member. Instead of the configuration that the rib or ribs or recess is provided on the backshell, said elements can be provided also on the exterior surface of the strain-relief member, which elements in turn interact with a corresponding element provided on the backshell which allows the aforementioned form-fitting connection.

It may be the case that the backshell has also a second through-opening which extends from an outside of the backshell to the interior chamber, in this case the strain-relief member and/or a further second strain-relief member may also protrude from the interior chamber into the second through-opening for providing the strain-relief to the cable.

Although herein a first and a second through-opening are described, the number of through-openings may be 1, 2, 3, 4, 5 and more through-openings. These through-openings may be provided additionally to the cable guide-through-opening and define an opening which is different from the cable guide-through-opening. Any of the through-openings are defined as through-openings, but it may also be the case, as explained for the first through-opening, that those openings do not extend to the outside.

It is beneficial that the first and second through-openings are provided on opposite sides of the backshell. The first and second through-openings may have substantially the same geometry, such that the first and second through-openings are aligned with respect to each other. When viewed along a central axis of the opening(s), it can thus be viewed from a first exterior side of the backshell to an opposite second exterior side of the backshell as the respective openings may be aligned and have the same geometry and dimensions.

In the particular case, it may be beneficial that the through-openings have a square or approximately rectangular shape, it may also have rounded or sharp corners; the respective through-opening or through-openings may also be circular or having an oval form. However, any geometry is possible. There should be provided a form-fit between the strain-relief member protruding to the opening which strain-relief member is somehow fixed to the cable.

According to a further development, the strain-relief member may comprise a first clamping element and a separate second clamping element. The clamping elements are configured to hold and fix the cable sandwiched therebetween. In particular, insofar as at least the two clamping elements are provided, these clamping elements are fixed together and clamp the respective cable in between. However, it is not necessary that the clamping element is constituted by two elements. It can also be constituted by one single element e.g. one element having a hinge between two arms, or also by more than two elements.

Therefore, the respective cable or cables may have a collar at least partially surrounding the cable or cables which is/are guided into the backshell. The collar may provide a form-fit interaction with the one or more through-openings. The collar is provided by the strain-relief member comprising the first and second clamping elements.

Instead of fixing the strain-relief member by clamping force to the cable or cables, it may be provided a strain-relief member which is fixed by a force-fit, such as gluing or bonding to the exterior of the cable. Further, the cover layer of the cable or cables may have been formed with a protrusion or the like, which interacts in a force-fit way with the through-opening. However, generally it is beneficial that the strain-relief member is a separate element.

It is beneficial that the first and second clamping elements have at least mirror symmetry. That means, when one of the clamping elements is mirrored at a plane which is provided outside the clamping element and is not crossing the clamping element, the second clamping element is a mirror image of a first clamping element. In view of reducing manufacturing costs, it is beneficial that the first and second clamping elements have the same geometry, but the first and second clamping elements are not delimited to such a configuration and may also have different geometries.

In particular, it is preferably the case that when the respective clamping elements sandwich the cable in the extension direction of the cable, the distal side of both clamping elements, which is the side which is provided on the side at the very end of the cable have the same geometry and the respective proximal side of both clamping elements have also the same geometry. The geometry at the distal side may be different from the geometry of the proximal side. It is in particular an advantage that the first and second clamping elements have substantially an identical configuration. Such a configuration is easy to produce because only one manufacturing machine is to be used for providing both clamping elements.

It is beneficial that the strain-relief member further comprises a fixation element for coupling the first and second clamping elements, such that the first and second clamping elements hold the exterior of the cable therebetween in a fixed state.

A strap which may be constituted by a zip tie can serve as fixation element. However, any further strap configuration is possible. The fixation element can also be provided by simple screws or bolts coupling the clamping elements, but the fixation element(s) is/are not delimited thereto.

In some embodiments, at least one or two of the clamping elements may have the following constitution.

The clamping element may have two bridging ribs extending parallel with respect to each other and with a predetermined distance with respect to each other. The two bridging ribs may be connected via crossing ribs extending between opposite surfaces of the two bridging ribs. The opposing surfaces of the bridging ribs are surfaces which face each other. A rib geometry means that the respective part or element may have a general appearance of a longitudinal element having an extension in a longitudinal direction. In particular, the rib elements may have approximately planar shapes.

It is beneficial that the crossing rib extends substantially orthogonally with respect to the bridging ribs and connects the two bridging ribs in a middle section thereof, when viewed in transversal direction orthogonally with respect to the extension of the bridging ribs. The crossing rib may extend in the extension direction of the cable.

In particular, it may be the case that a groove portion which holds the strap is provided by a radially outer surface of the crossing rib and at least a region of the opposing surfaces of the bridging ribs which face each other. The radial outer surface of the crossing rib is a surface which directs away from the cable and is provided on a radial outer side with respect to the cable.

In particular, one bridging rib of one clamping element, when both clamping elements are fixed together, together with a second bridging rib of the adjacent clamping element defines a cable fixation opening having a radial inner clamping surface for fixing the exterior of the cable to the strain-relief member. That means, each rib may provide a section defining an opening through which the cable is guided, when the respective fixation elements sandwich the cable and are pressed together.

The bridging ribs may have planar surfaces, such planar surfaces may extend substantially perpendicularly to the extension direction of the cable. In particular, the clamping element has two bridging ribs each having a planar surface, which face away from each other. Said planar surfaces define first locking surfaces interacting with opposing second locking surfaces provided by the respective through-opening into which the respective clamping element protrudes to provide a form-fit connection between the strain-relief member and the backshell. This interaction of the planar surfaces of the bridging ribs with the planar surfaces defining the portion of the through-opening provide this form-fit connection.

In particular, the strain-relief member is provided in a form-fitting manner in any one of the openings.

It is beneficial that the respective strap is constituted by a zip tie which can be opened and/or loosened without destroying the zip tie through the first and/or second opening of the backshell. However, it is not necessarily the case that the zip tie can be opened and/or loosened while leaving the backshell closed. The zip tie can also be completely inside the interior chamber.

The zip tie may have at one end thereof a portion with an opening through which the other end of the zip tie can be pulled, such that the zip tie is self-fixing.

When mounting the respective cable or a bundle of cables to the cable connector, in a first step, the end portion of the cable or the bundle of cables, in particular cables having different sizes, is clamped between two clamping elements which are fixed together via the zip tie, the respective force of the zip tie can be adapted and during this step the cables, which are to be fixed in the cable connector, are rearranged in a closest possible dense arrangement. Thereafter, the strain-relief member provides a certain collar surrounding the cable or a bundle of cables. This collar interacts with the backshell to provide the strain-relief.

According to a further embodiment, the backshell may have at least two backshell parts which are adapted to be fixed with respect to each other by fixing means in order to provide the interior chamber. However, it is not necessary that the backshell is constituted by two parts. The backshell may be formed as a unitary part having one window or a flap which can be opened and closed. Any further configuration of the backshell is possible.

The backshell may have at a rear side thereof a cable-guide-through-opening and on an opposite side from the rear side, which is a front side, a front element which provides the pin contacts or socket contacts. In particular, this front element may include the D-shaped shield, in particular the D-shaped metal shield.

It may be the case that the at least two backshell parts define the cable guide through-openings such that each of the two backshell parts comprise a portion of the cable guides through-opening.

It is further possible that the first and/or the second through-openings are arranged, e.g., substantially orthogonally arranged, with respect to the cable-guide-through-opening.

The cable connector may have a front element for connecting to a socket or plug or a further connector, namely the front element may have pin contacts or sockets. The pin contacts or sockets, which are named as connector elements being contacted electrically with a wire portion provided within the cable.

The respective cable may be one single cable or a plurality of cables e.g. a bundle of cables, such bundle of cables may define a cable harness. The plurality of cables may not be provided with a surrounding shell layer, but may be constituted by individual cables. These individual cables may have different cross-sections. Therefore, a bundle of cables, which extends parallel to each other, may extend into the interior chamber through the cable-guide-through-opening.

At an end portion of the cables, in particular in the region where the respective strain-relief member is mounted, there may be provided shell elements which are crimped to the respective cables, wherein the shell elements provide a secure interaction with the strain-relief member.

It is beneficial that the strain-relief member interacts with the backshell in a manner that a predetermined relative movement between the backshell and the strain-relief member is allowed. In this case, the force-fit connection between the backshell and the strain-relief member may be such that the strain-relief member can be translated in at least two opposite directions before it interacts with opposing locking surfaces of the backshell. Thus the strain relief may not be directly mechanically secured to the backshell. The free floating nature of the clamping elements allows cables to move slightly without any strain, allowing for a better cable securing system than rigidly held cables.

According to a further aspect, the cable connector arrangement may have a backshell defining an interior chamber, a strain-relief member and a cable which is guided into the interior chamber.

The backshell may have one or more recesses extending into the interior chamber and/or one or more through-openings extending from an outside of the backshell to the interior chamber.

The strain-relief member may have a fixing surface adapted to be fixed to an exterior of the cable. The strain-relief member may protrude from the interior chamber into a respective one of the one or more recesses or the one or more through-openings for providing the strain-relief to the cable.

Insofar as it is described herein a recess, such a recess may have the form of a through-opening which extends from an outside of the backshell to the interior chamber, or such a recess may be provided at in interior wall of the backshell and does not go through the wall such that it is not visible from an exterior of the backshell.

According to a further aspect, a D-Sub type cable connector may be provided having a strain-relief member that is form-fit mounted in a through-opening extending to an exterior through wall of a backshell. The strain-relief member can be decoupled or coupled to a cable extending into the interior without opening of the D-type cable connector.

However, the scope of protection is not limited to particular elements described in the embodiment(s) shown in the figures and can be implemented in various forms. In the broadest sense, each of the aforementioned features can be provided singularly or in combination with respect to each other. Unless the contrary is described, each of the aforementioned features is not inextricably linked to any other of the aforementioned features. In particular, the configuration of the prior art connector described in U.S. Pat. No. 6,641,429 B1 concerning the configuration of the connector itself, with the exception of the configuration of the strain-relief member, is incorporated by reference herein in its entirety.

For a better view, not all reference signs may be included in each Figure, and corresponding elements have the same reference signs across different Figures.

In a particular embodiment, as depicted in FIG. 1, the shell 1 comprises two backshell parts 1*a* and 1*b*, the back-shell parts 1*a*, 1*b* are fixed together by screws 2. These screws 2 are screwed into bores 3 of the respective other backshell part, which bores are formed in the respective backshell parts 1*a*, 1*b* (the bores are not visible in the Figure for the backshell part 1*a*). The back-shell parts 1*a*, 1*b*, when fixed together to define the back-shell 1, define a cable guide-through-opening 4, through which a cable 5 can be guided into an interior chamber 6 defined in the back-shell 1. In the present case there is provided a plurality of cables 5 constituting a bundle of cables 5, each cable 5 of the plurality of cables 5 is extending parallel with respect to each other and are contacting each other at an exterior thereof.

The cables may have different diameters (such as, e.g., the cable in the middle in the upper row in FIG. 1). In particular, in the present case there is provided one cable of the six cables which has a smaller diameter than the other five cables. However, it is not necessary that the cables have different diameters, but it is possible, when the cables have different diameters, to fix all the cables together with the arrangement of the specific strain-relief member 7.

The strain-relief member has in the present Figures reference sign 7 and is constituted in the present example by a first and second clamping element 8*a*, 8*b* and a further described zip tie 9 (as fixation element).

In FIG. 1, the clamping element 8*a* is shown in a state in which it is not secured by the zip tie 9. Said view is only provided so that the configuration in the region where the bundle of cables 5 are fixed to the backshell can be better seen. The assembled configuration can be derived from FIGS. 4 to 6. Furthermore, the clamping element 8*a* is fixed to the bundle of cables as it is shown for the clamping element 8*b* in FIG. 1.

Those clamping elements 8*a*, 8*b* are secured to the cable 5 or bundle of cables 5 via a strap which is in particular provided in the present case by the zip tie 9.

The respective clamping elements 8*a*, 8*b* may be firmly secured to the bundle of cables and provide a certain collar. Said collar serves as strain-relief member. This strain-relief member 7 interacts in the present case with the two through-openings 10*a*, 10*b* which are provided in an exterior surface of the backshell 1.

The through-openings 10*a*, 10*b* in the present case go through from an exterior through the casing to an interior. There is provided a form-fit between the protruding portions of the collar which is constituted by the strain-relief member 7 and the inner side walls (edges) of the through-openings 10*a*, 10*b*.

The interaction of the strain-relief member with the recesses or in the particular embodiment the through-openings 10*a*, 10*b*, has the technical effect, so that, depending on the dimensions of the recess/through-openings 10*a*, 10*b* with respect to the strain-relief member, it is possible to direct the strain-relief into a desired direction, while allowing a movement (e.g., a translation) of the cable or cable which are held by the strain-relief member, together with the strain-relief member in a further desired direction. As there may be a predetermined clearance between the strain-relief member and the recess the inventive connector is highly adaptable.

There may be provided a form-fit interaction of the strain-relief member, which protrudes from the interior chamber into, which form-fit interaction has or has not a predetermined clearance for allowing a certain adaptability.

In the specific case, each clamping element 8*a*, 8*b* has two bridging ribs 11*a*, 11*b*, which extend parallel to each other and have a predetermined distance with respect to each other. However, the configuration of the clamping element is not delimited to the two bridging ribs. It may also be the case that the clamping element is only constituted by one single bridging rib, bridging the cable or cables. These bridging ribs 11*a* and 11*b* are connected by a crossing rib 12. In the Figure, only the configuration of the clamping element 8*a* is visible. However, the clamping element 8*b* has the same construction. However, this is not necessarily the case.

An outer surface 13 of the crossing rib 12, which is provided on a radial outer side with respect to the bundle of cables 5 and portions of facing surfaces 14 of the bridging ribs 11*a*, 11*b*, which face each other, define a groove portion 15 in which the respective strap or zip tie 9 may be guided.

When mounting the respective strain-relief member 7 to the bundle of cables 5 or the single cable 5, the respective first and second clamping element 8*a*, 8*b* sandwich the respective cable 5 or bundle of cables 5. Thereafter, the zip tie 9 is wound around the first and second clamping element 8*a*, 8*b* and provided in the respective groove portions 15 of both clamping elements 8*a*, 8*b* and the zip tie 9 can be tightened to fix the respective strain-relief member to the exterior of the cables 5 or bundles of cables 5.

The crossing rib has in the crossing direction, which corresponds to the extension direction of the cables, two end portions. Said end portions are connected midway of the respective bridging ribs thereto. Therefore, the respective clamping elements 8*a*, 8*b* have at the respective ends in the respective direction crossing the extension direction of the cable free spaces such that different sizes of cables or different cross-sectional sizes of bundles of cables can be fixed with the zip tie 9, because in the region of the free spaces, the zip tie 9 can come in close contact with the exterior of the cables 5. Furthermore, if one, two or three of the six cables 5 in the present embodiment were not provided when the respective zip tie 9 is fixed, it would still be possible to firmly mount the clamping elements to the outer surface of the cable or bundle of cables.

Each of the respective bridging ribs 11*a*, 11*b* provides at a radial inner side an edge or surface, said surfaces of the two first and second clamping elements 8*a*, 8*b* provide an opening which fixes the respective cable 5.

In one embodiment, the through-openings 10*a*, 10*b* of the backshell 1 are provided on an opposite side of the backshell 1. These through-openings 10*a*, 10*b*, when viewed along a central axis thereof, are aligned with respect to each other and have the same geometry. However, the geometries can also be different and are not delimited to the aforementioned geometry. In one particular embodiment, the through-openings 10*a*, 10*b* have a square shape with rounded corners. In one embodiment, the respective longer surfaces (edges) of the square shaped through the openings interact with the respective outer surfaces of the bridging ribs 11*a*, 11*b* to provide a form-fit interaction.

The respective bridging ribs 11*a*, 11*b* and also the first and second clamping member 8*a*, 8*b* have an extension direction perpendicular to the extension direction of the cable 5. The first and second through-openings 10*a*, 10*b* are provided on opposite sides of the backshell 1 and perpendicular to the cable guide-through-opening 4. The respective through-openings 10*a*, 10*b* are provided at a rear side of the backshell 1 in the vicinity of the cable guide-through-opening 4 to provide a secure strain-relief.

The respective backshell parts 1*a*, 1*b* may be made of plastic material (e.g., in particular a thermoplastic material) and have, on an outer exterior surface, some rib portions for providing a strength. However, the backshell parts 1*a*, 1*b* may also be made from metal or any other material.

The respective bores 3 are provided in protrusions, which are uniform parts of the respective backshell parts 1*a*, 1*b*. In an embodiment, the backshell parts 1*a*, 1*b* may be generated by injection molding.

In one embodiment, a front element 17, which may be made of metal, is provided. This front element may have a D-shaped collar to provide a D-Sub cable connector.

Figure 2:
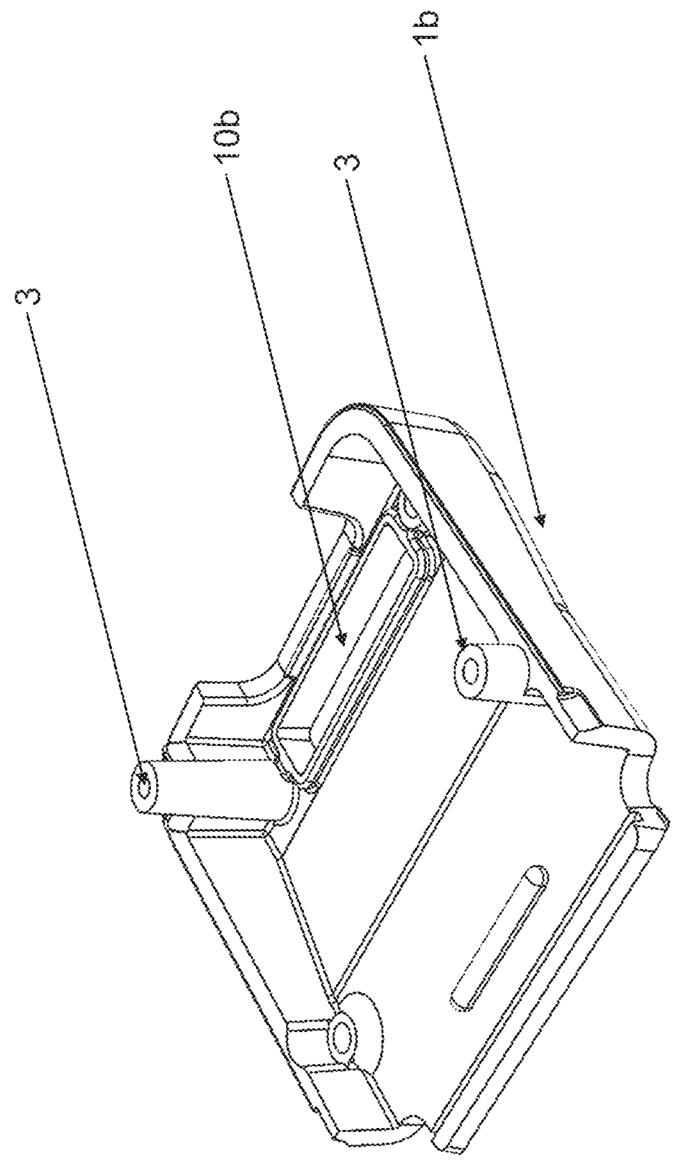
FIG. 2 shows the lower backshell part of the backshell shown in FIG. 1.
Figure 3:
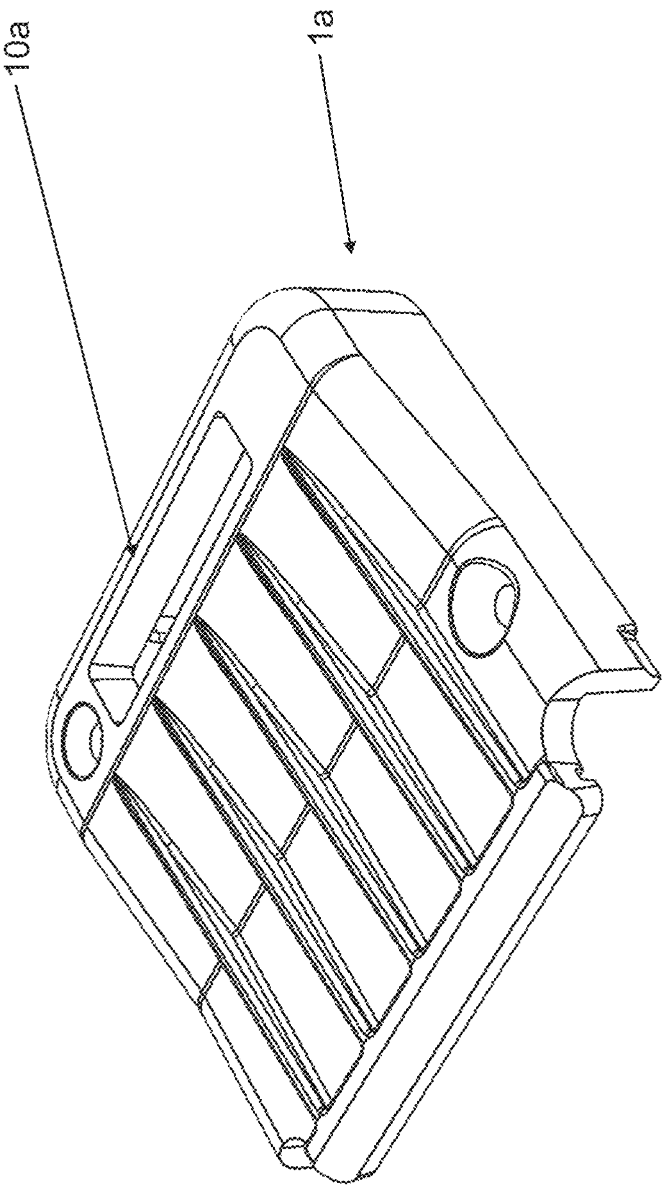
FIG. 3 shows the upper backshell part of the backshell shown in FIG. 1.

FIG. 2 shows the lower backshell part 1*b* of the backshell 1 shown in FIG. 1. FIG. 3 shows the upper backshell part 1*a* of the backshell 1 shown in FIG. 1. In the present embodiment, both backshell parts have the same configuration, but, in other embodiments, this may not necessarily be the case.

Figure 4:
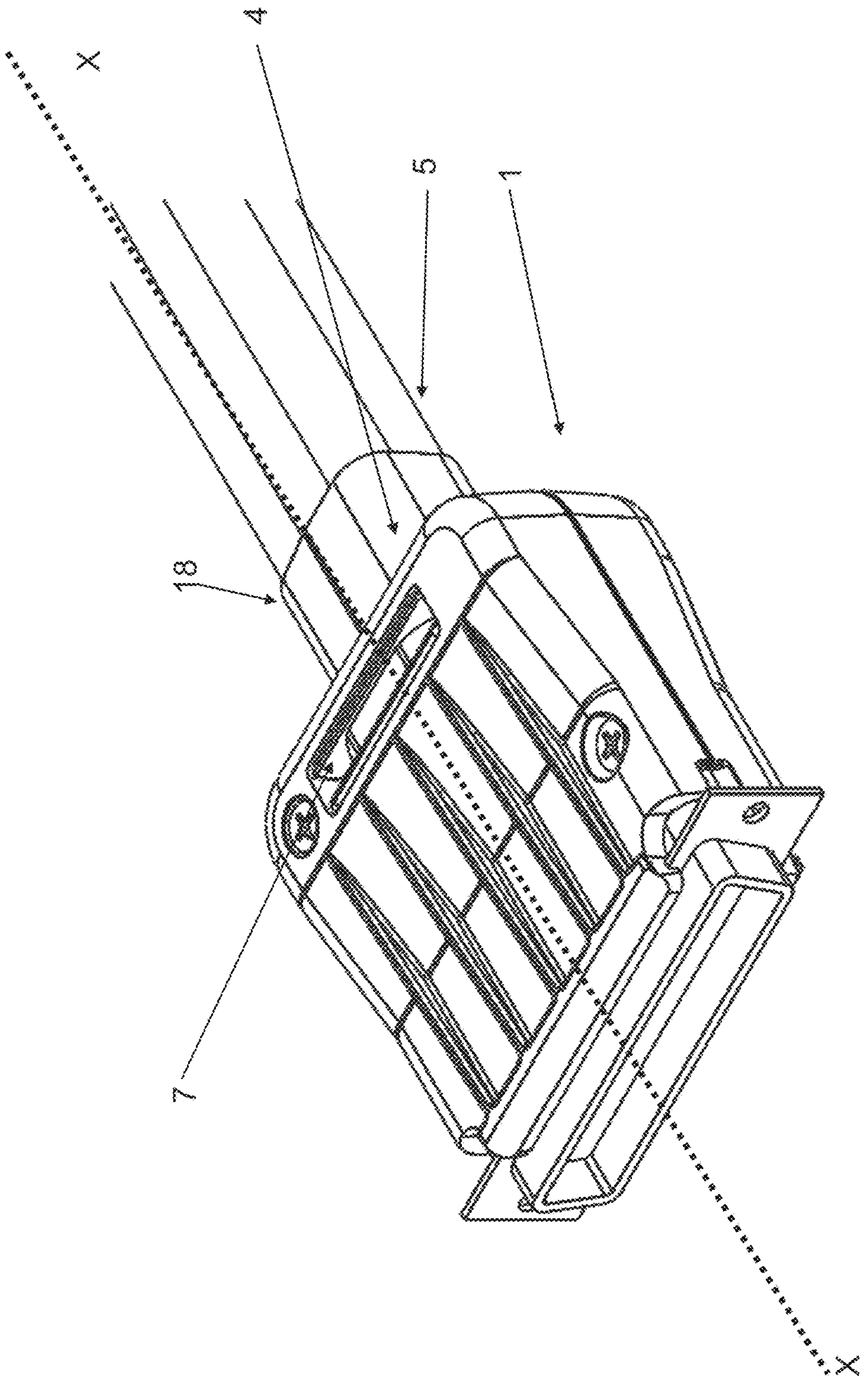
FIG. 4 shows the backshell shown in FIG. 1 in an assembled configuration.

FIG. 4 shows the backshell 1 shown in FIG. 1 in an assembled configuration. From a rear side of the backshell 1, the bundle of cables are protruding. A sleeve portion 18 surrounds the end portion of the cables protruding into the backshell 1. Said sleeve portion 18 can also be seen in FIGS. 5 to 7. With said sleeve portion 18, the bundle of cables may be, in a first step, fixed together to allow the mounting of the clamping elements.

Figure 6:
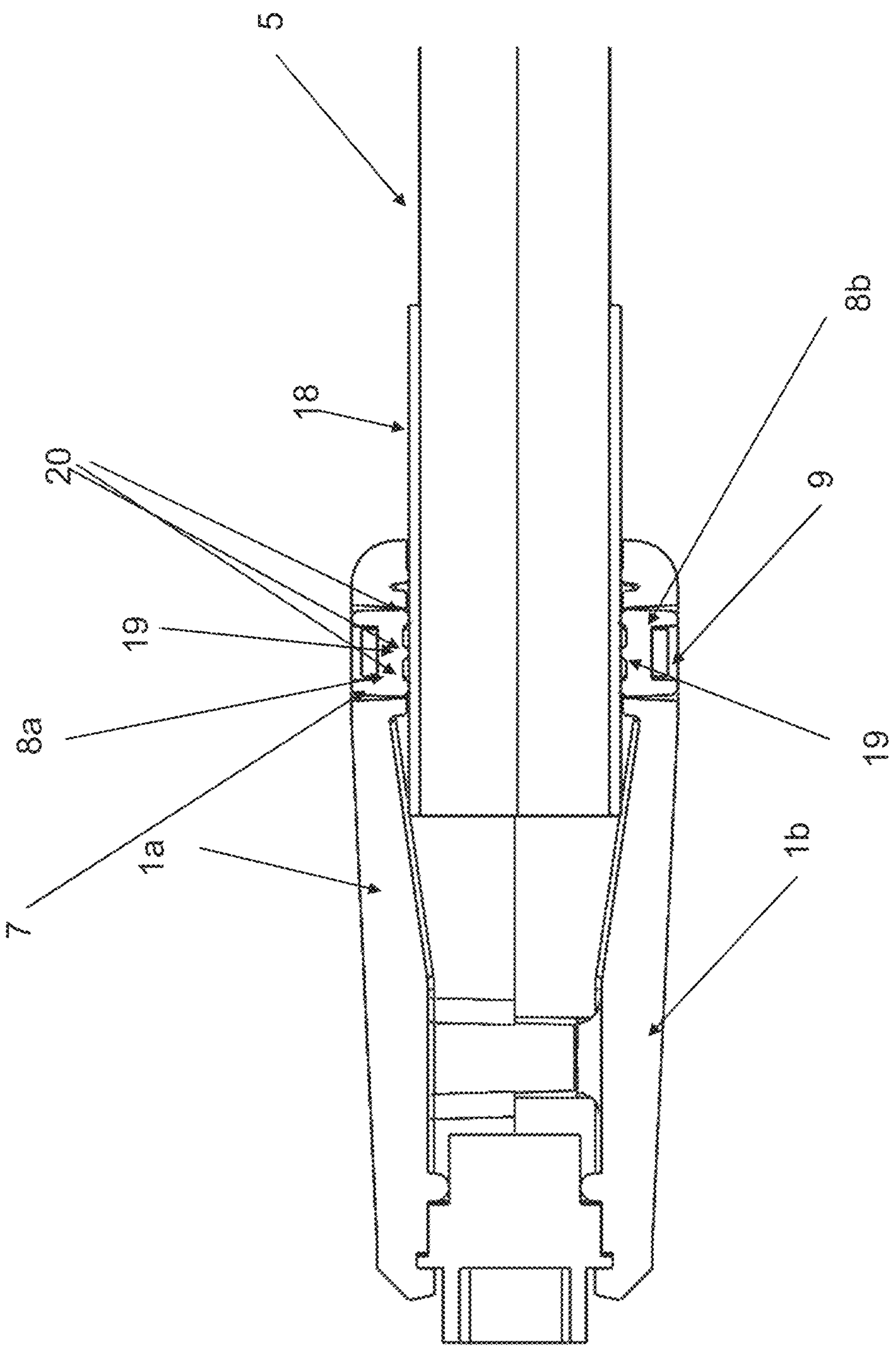
FIG. 6 shows a cross-sectional view of the backshell shown in FIG. 4 along the line X-X in FIG. 4.

As derivable from FIG. 6, which shows a cross-sectional view of the backshell 1 shown in FIG. 4 along the line X-X in FIG. 4, the clamping elements 8*a*, 8*b* clamp the bundle of cables 5 at the region of the sleeve portion 18. The sleeve portion 18 may have a certain hardness or softness so that the inner surface of the radial inner surface of the clamping elements 8*a*, 8*b* can be prevented from slipping along the surface thereof.

In one embodiment, the sleeve portion may be a single piece of heat shrink. However, such a constitution is not necessary. In some embodiments, the sleeve portion can be omitted entirely. However, there can be used a single piece of heat shrink, individual pieces of heat shrink on all cables, no heat shrink at all, or any other technically feasible means to add security or friction to the cable or cables 5.

Figure 7:
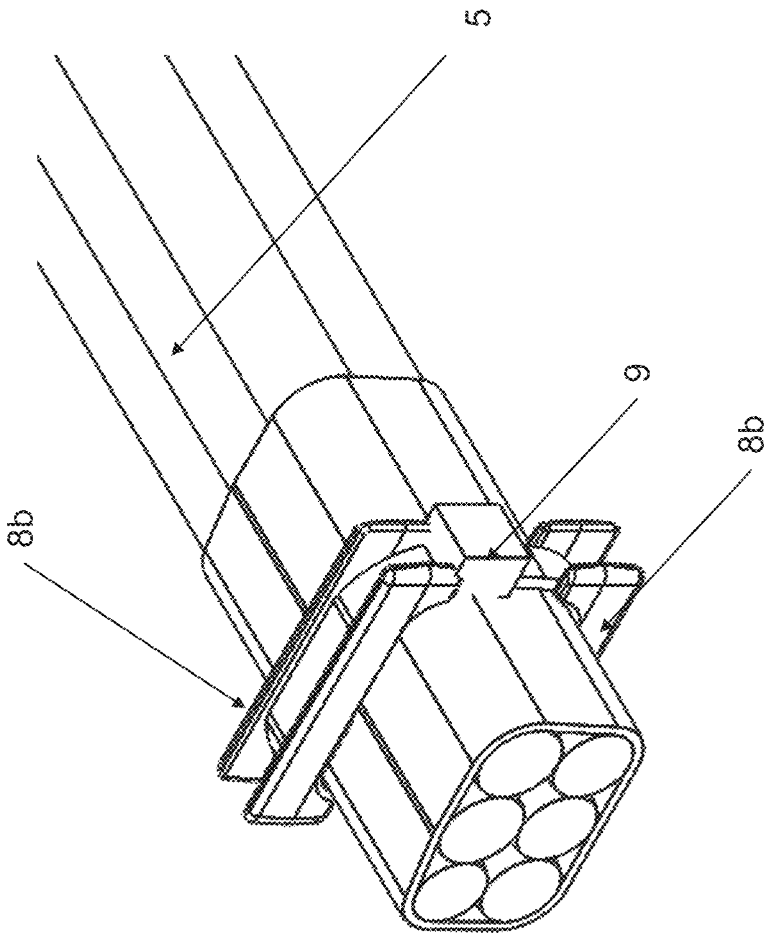
FIG. 7 shows a bundle of cables from the situation of FIG. 1 which have the strain-relief member mounted thereto ad an end-section thereof.
Figure 9:
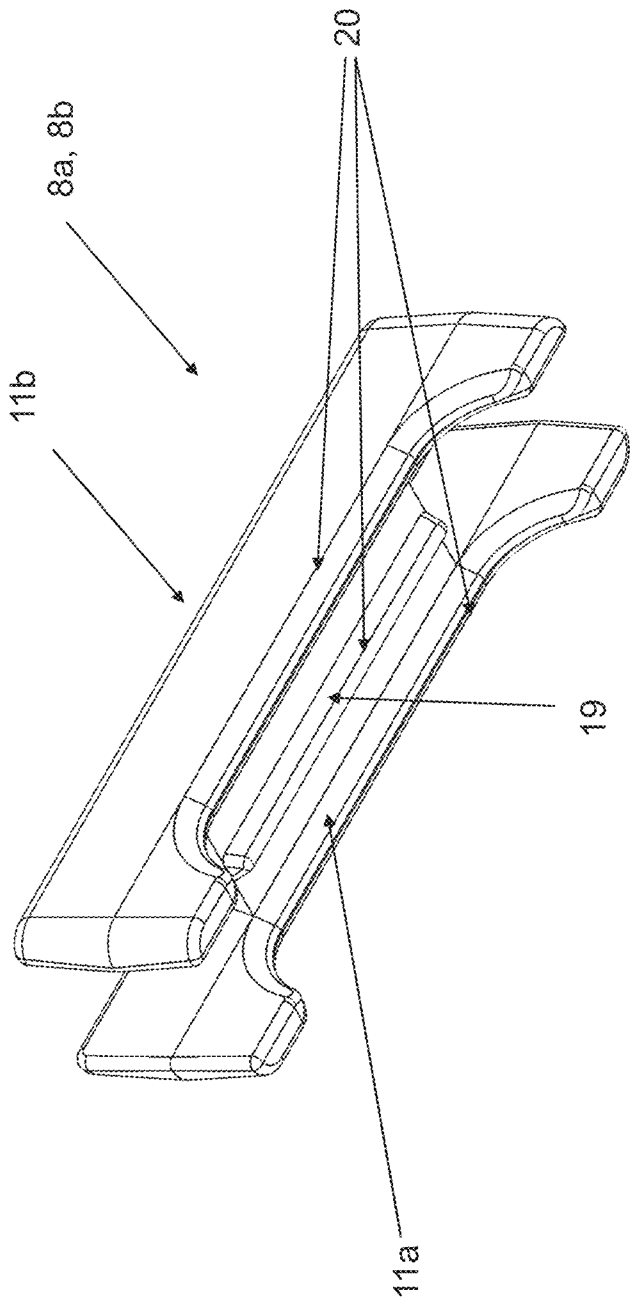
FIG. 9 shows a bottom perspective view of one of the first and second clamping elements form the embodiment shown in FIG. 1

FIG. 7 shows a bundle of cables 5 from the embodiment depicted in FIG. 1, which have the strain-relief member 7 mounted thereto at an end-section thereof. In FIG. 9, which shows a bottom perspective view of one of the first and second clamping elements 8*a*, 8*b*, it can be seen that the crossing rib 12 has a protrusion 19, which is directed to the exterior surface of the cables 5 and/or the sleeve portion 18 to provide a better fixation and to make a point contact.

In one embodiment, three teeth 20 are provided which are gripping the exterior surface of the cables 5 and/or the sleeve portion 18. One tooth of the three teeth is provided by the protrusion 19 and the two remaining teeth of the three teeth 20 are provided by the radial inner surface of the bridging ribs 11*a*, 11*b*.

Figure 5:
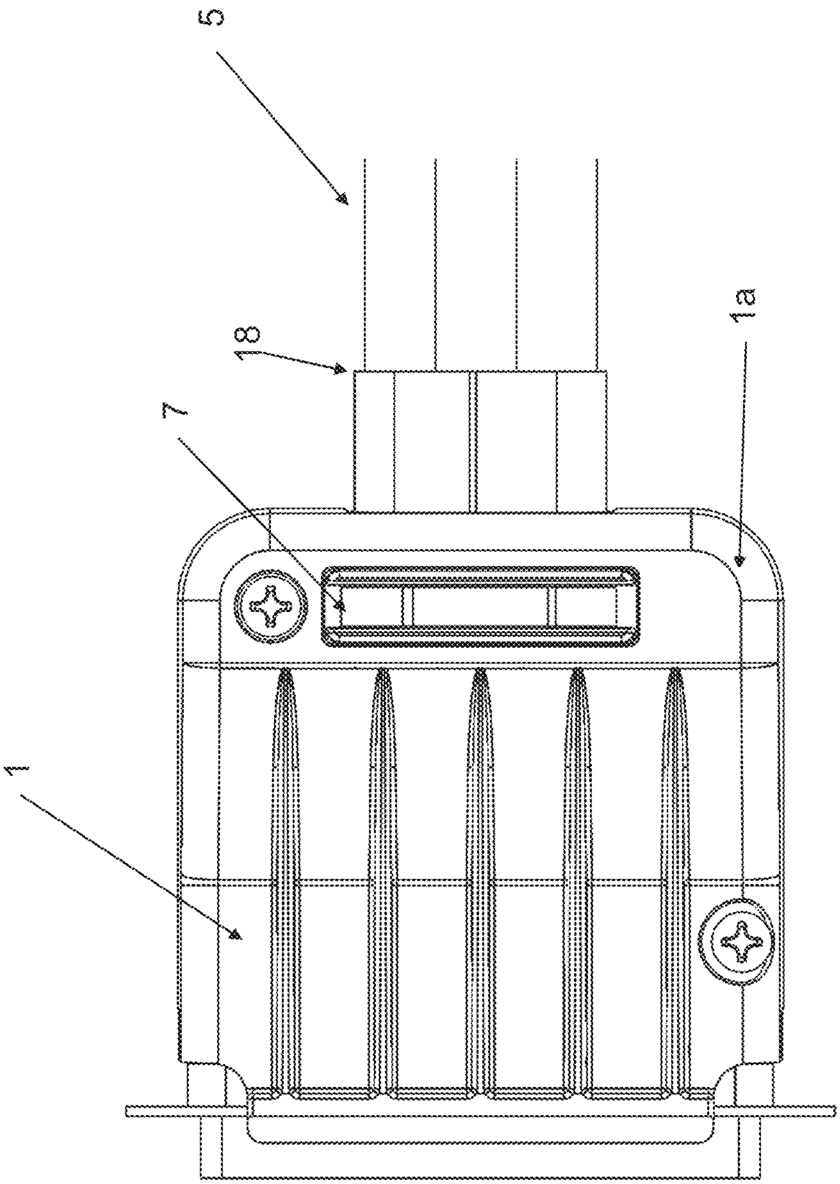
FIG. 5 shows the backshell shown in FIG. 4, when viewed from top.
Figure 8:
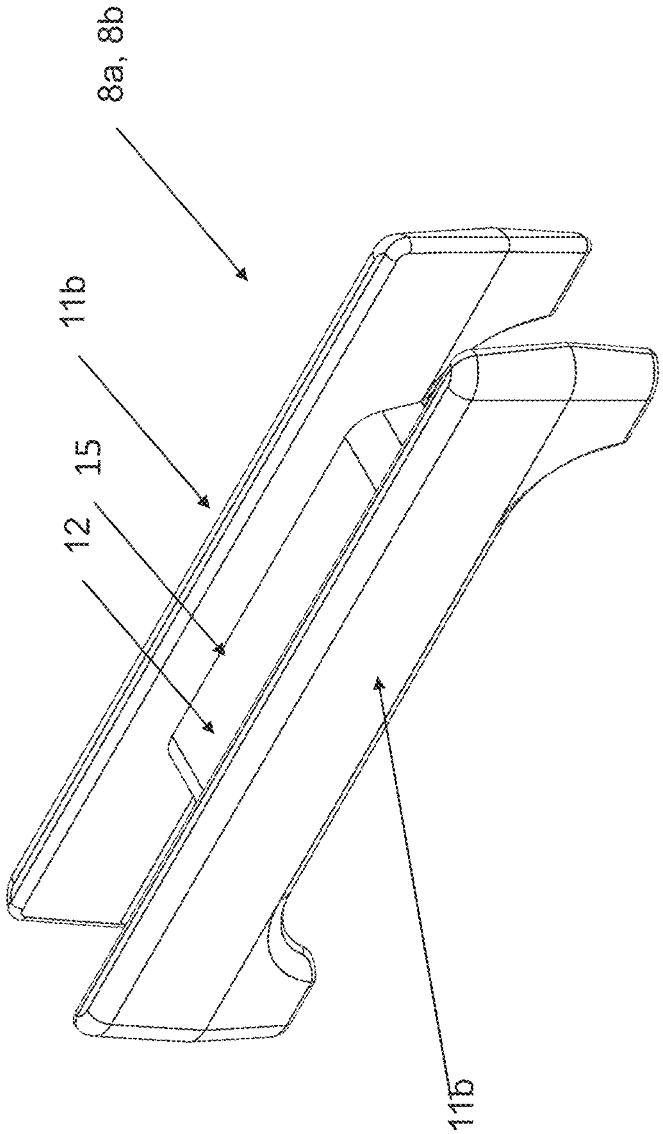
FIG. 8 shows a top perspective view of one of the first and second clamping elements form the embodiment shown in FIG. 1.

FIG. 5 shows the backshell 1 shown in FIG. 4, when viewed from top. FIG. 8 shows a top perspective view of one of the first and second clamping elements 8*a*, 8*b*, from the embodiment shown in FIG. 1.

The aspects of the present disclosure described above are not delimited to a D-Sub cable connector and can be used for any cable connector.

The respective first and second through-openings may not be through-openings, but simply openings which are closed with respect to the exterior. It must only be possible that there is a form-fit between the strain-relief member and the openings which are in this case recesses in the interior of the backshell. Insofar as it is described herein, a recess may have the form of a through-opening which extends from an outside of the backshell to the interior chamber, or such a recess may be provided at in interior wall of the backshell and does not go through the wall such that it is not visible from an exterior of the backshell.

Although, in the specific case the backshell 1 is made of two elements, said backshell 1 may be formed as a unitary element or may be formed with a hinge between these two parts, such that the respective backshell 1*a*, 1*b* parts are connected with one another.

Although there is described a rectangular through-opening geometry, the geometry of the through-opening is not delimited to a rectangular shape, as the through-opening geometry may be a square shape, a round shape, an oval shape, or any other shape.

Although there are two through-openings described, in alternative embodiments, only one opening or more than two openings may be provided.

Although there is described a specific strain-relief member, it is not necessary in some embodiments that the strain-relief member has this configuration. In particular, it is only provided that there is a form-fit between a protruding portion protruding from an exterior of the cable or the bundle of cables with the through-opening.

Although, the two clamping members in the specific case have the same constitution, it is beneficial that they are at least mirror symmetrical, however, this is also not necessary in some embodiments.

The respective first and second clamping elements in some embodiments may be made from metal. Alternatively, the first and second clamping elements may be made from plastic material, and the material used for the clamping members may be a different material as the material used for the backshell.

Although, the ribs (i.e., the crossing ribs and bridging rib) have in an embodiment a straight extension, said ribs do not need to be run in this fashion. The ribs can be provided by any areas of the clamping elements, which are suitable to deform and interfere with the cables when tightened to securely hold them. Said deformation and interfering means can have any shape such as dots, wedges, or a roughened surface.

Although, in one exemplary embodiment there is shown a bundle of cables, it may also be provided that a single cable is provided. However, it may be beneficial to provide a plurality of cables where, optionally, some cables have a different diameter than the other cables. By the configuration of the zip tie, the respective configuration of the first and second clamping elements is not changed for different cable sizes or numbers, only the zip tie, when fixing, makes the arrangement of the cables so dense that they are fixed together to the strain-relief member.

In an embodiment, the cables have a forward end portion with a crimped collar portion which is a separate element that is crimped to the outer exterior surface of the cable. The cables, in the embodiment, may include cables having a cover layer of non-electrically conductive material and an inner-electrically conductive wire. The cables may have a plurality of wires within the cover layer or, alternatively, other forms of cables can be used.

The respective configuration can be provided for any connector in which there should be provided a strain-relief.

The present disclosure is not delimited to the specific embodiments, but can be provided in the broadest sense of the description and claims insofar as the respective configuration does not depart from the scope and gist of the present disclosure.

While the embodiments of the present disclosure have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below. Additionally, statements made herein characterizing the embodiments of the present disclosure refer to an embodiment and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 backshell
1*a*, 1*b* backshell parts
2 screw
3 bore
4 cable guide-through-opening
5 cable
6 interior chamber
7 strain-relief member
8*a*, 8*b* first and second clamping element
9 zip tie
10*a*, 10*b* though-opening
11*a*, 11*b* bridging rib
12 crossing rib
13 radial outer surface
14 facing surfaces
15 groove
17 front element
18 sleeve portion
19 protrusion
20 tooth

What is claimed is:

1. A cable connector having a backshell defining an interior chamber, wherein the backshell has a cable-guide-through-opening, through which a cable can be guided into the interior chamber; and the cable connector has a strain-relief member, wherein:

the backshell has at least a first recess extending to the interior chamber;

the strain-relief member is adapted to be fixed to an exterior of the cable, the strain-relief member protrudes from the interior chamber into the first recess, the strain-relief member comprises a first clamping element and a second clamping element configured to hold and fix the cable sandwiched therebetween, the strain-relief member further comprises a fixation element for fixing together the first and second clamping elements such that the first and second clamping elements hold therebetween, in a fixed state, the exterior of the cable, the fixation element is provided by a strap which is wrapped around a radial exterior surface of the first and second clamping element, and the radial exterior surface is a surface provided in a radial outer direction with respect to the cable.

2. The cable connector according to claim 1, wherein the backshell has at least a second recess extending into the interior chamber, and wherein the strain-relief member further protrudes from the interior chamber into the second recess.

3. The cable connector according to claim 2, wherein the first recess defines a first through-opening extending from an outside of the backshell to the interior chamber, wherein the strain-relief member protrudes from the interior chamber into the first through-opening, and/or the second recess defines a first through-opening extending from an outside of the backshell to the interior chamber, wherein the strain-relief member protrudes from the interior chamber into the second through-opening.

4. The cable connector according to claim 3, wherein the first and second through-openings are provided on opposite sides of the backshell, and have substantially the same opening geometry, such that the first and second through-openings are aligned with respect to each other along a center axis of the first and second through-openings from a first exterior side of the backshell to an opposite second exterior side of the backshell.

5. The cable connector according to claim 3, wherein the first and/or second though openings are arranged substantially orthogonally with respect to the cable-guide-through-opening.

6. The cable connector according to claim 3, wherein the cable connector includes a front element for connecting to a socket and/or to a further connector with at least a connector element being contacted to be in an electrically conducting connection with a wire provided within the cable.

7. The cable connector according to claim 1, wherein the first and second clamping elements have at least a mirror symmetrical configuration.

8. The cable connector according to claim 1, wherein the first and second clamping elements have a substantially identical configuration.

9. The cable connector according to claim 1, wherein at least one of the first and second clamping element is constituted by two bridging ribs extending parallel with respect to each other, separated by a predetermined distance with respect to each other, and wherein the two bridging ribs are connected by a crossing rib extending between opposing surfaces of the two bridging ribs, and the opposing surfaces face each other.

10. The cable connector according to claim 9, wherein the crossing rib extends substantially orthogonally to the two bridging ribs.

11. The cable connector according to claim 10, wherein, with respect to the cable, a radially outer surface of the crossing rib, together with at least a region of the opposing surfaces of the bridging ribs which face each other, define a groove portion in which the strap is securely held.

12. The cable connector according to claim 9, wherein each bridging rib of a respective one of the first and second clamping elements defines with a respective one bridging rib of the respective other one of the first and second clamping elements a cable fixation opening having a radially inner clamping surface, for fixing the exterior of the cable to the strain-relief member.

13. The cable connector according to claim 9, wherein planar surfaces of the two bridging ribs of the first and/or second clamping element define first locking surfaces that interact with opposing second locking surfaces provided by the respective through-opening into which the respective clamping element protrudes to provide a form-fit connection between the strain-relief member and the backshell.

14. The cable connector according to claim 1, wherein the strain-relief member is provided in a form-fitting manner in the first and/or a second recess of the backshell.

15. The cable connector according to claim 1, wherein the strap comprises a zip tie, which can be opened and/or loosened through the first and/or second through-opening of the backshell.

16. The cable connector according to claim 1, wherein the backshell includes at least two backshell parts, which are adapted to be fixed with respect to each other by a fixing means in order to provide the interior chamber.

17. The cable connector according to claim 16, wherein each of the at least two backshell parts has a respective one of first and second though-openings.

18. The cable connector according to claim 17, wherein the at least two backshell parts define the cable-guide-through-opening such that each of the least two backshell parts comprises a portion of the cable-guide-through-opening.

19. The cable connector according to claim 1, wherein the cable is constituted by a plurality of cables which define a cable harness, wherein each cable in the plurality of cables has a non-electrically conductive cover layer and an electrically conductive wire covered by the cover layer.

20. The cable connector according to claim 1, wherein the strain-relief member interacts with the backshell in a manner that a predetermined relative movement between the backshell and the strain-relief member is allowed.

21. The cable connector according to claim 1, wherein a force-fit connection between the backshell and the strain-relief member is such that the strain-relief member can be translated in at least two opposite directions before the strain-relief member interacts with an opposing locking surfaces of the backshell.

* * * * *